United States Patent [19]

Neisen

[11] Patent Number: 4,558,769

[45] Date of Patent: Dec. 17, 1985

[54] MARINE DRIVE HAVING SPEED CONTROLLED LOCK-UP TORQUE CONVERTER

[75] Inventor: Gerald F. Neisen, Oshkosh, Wis.

[73] Assignee: Brunswick Corp., Skokie, Ill.

[21] Appl. No.: 452,764

[22] Filed: Dec. 23, 1982

[51] Int. Cl.⁴ .............................................. B60K 41/02
[52] U.S. Cl. ................................. 192/3.31; 192/0.076; 192/0.096
[58] Field of Search ..................... 192/3.28, 3.29, 3.31, 192/3.3, 3.58, 103 R, 0.096, 0.075, 0.076

[56] References Cited

U.S. PATENT DOCUMENTS

| | | | |
|---|---|---|---|
| 2,584,032 | 1/1952 | Lapsley | 192/3.31 X |
| 2,891,640 | 6/1959 | Binder | 192/3.31 |
| 3,390,594 | 7/1968 | Gillespie | 192/3.31 X |
| 3,887,048 | 6/1975 | Jahnel et al. | 192/3.28 |
| 3,985,046 | 10/1976 | Morris et al. | 192/3.31 X |
| 4,388,987 | 6/1983 | Hennessey et al. | 192/3.31 X |
| 4,428,259 | 1/1984 | Kubo et al. | 192/3.31 X |

Primary Examiner—George H. Krizmanich
Attorney, Agent, or Firm—Andrus, Sceales, Starke & Sawall

[57] ABSTRACT

A marine drive for a boat includes a torque converter between the engine and propulsion unit. The torque converter has a slip condition in which a torque magnifying, fluid coupling is interposed between the engine and the propulsion unit. The slip of the torque converter enhances acceleration of the boat by permitting rapid increases in engine speed and power through relieving propeller loading of the engine. The torque converter has a lock-up condition in which the input and output shafts are directly and mechanically coupled together to provide highly efficient, sustained speed operation of the boat. A control operates the torque converter between the slip and lock-up conditions. This control may be obtained responsive to operating conditions in the engine or torque converter, such as engine speed, torque converter slip, throttle position, intake manifold vacuum, and engine ignition advance. The torque converter may be placed in the slip condition at low speeds for slow speed trolling and during the shifting of direction controlling gears in the marine drive.

2 Claims, 14 Drawing Figures

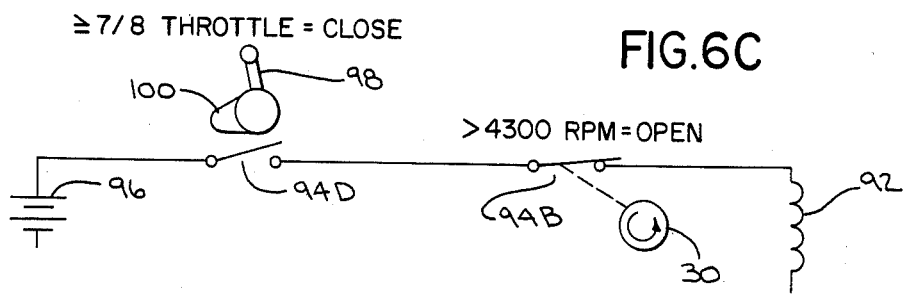
FIG.6C
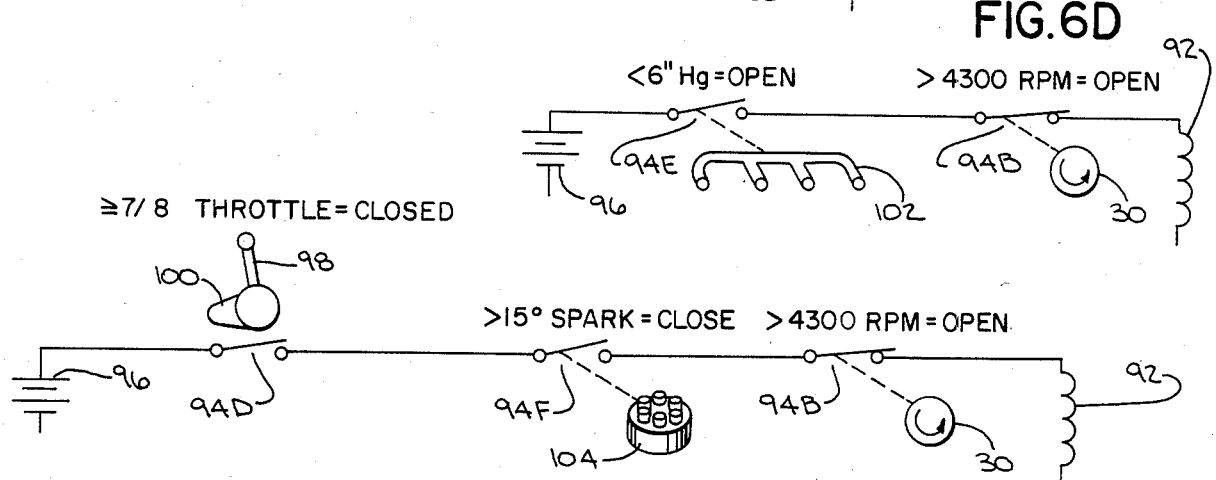
FIG.6D
FIG.6E
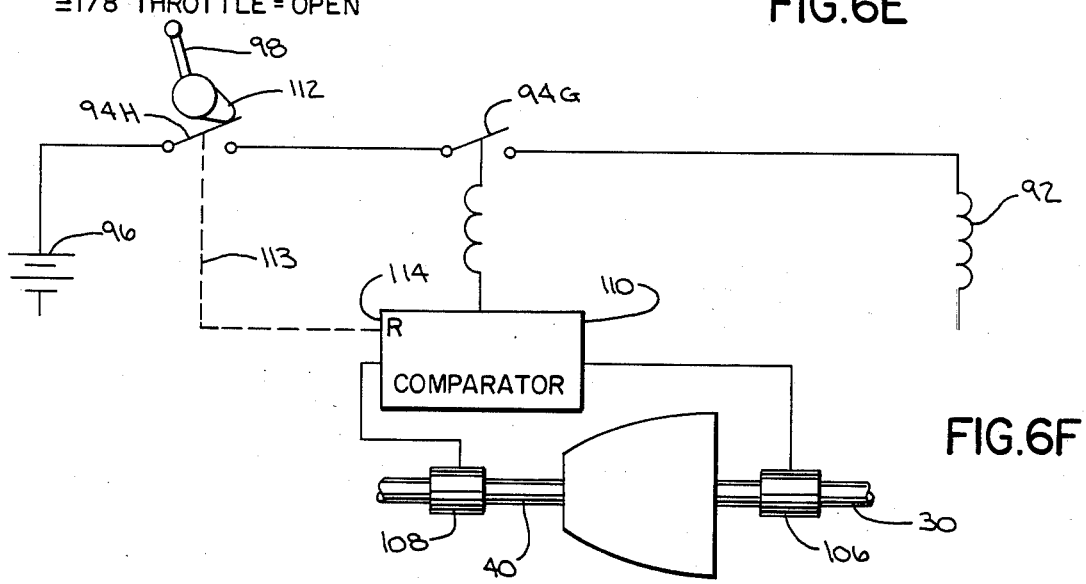
FIG.6F
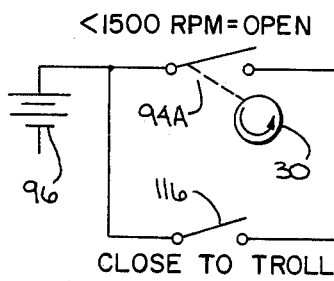
FIG.6G
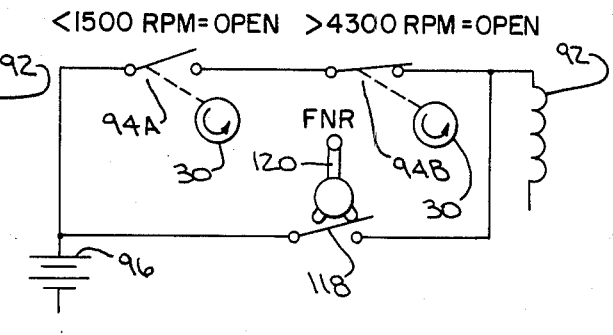
FIG.6H

MARINE DRIVE HAVING SPEED CONTROLLED LOCK-UP TORQUE CONVERTER

In a conventional marine drive, the engine is directly and mechanically connected to the propeller through a fixed ratio gear box. The speed of the propeller is always proportional to the speed of the engine in the ratio established by the gears of the gear box.

The characteristics of the marine drive including the gear ratio in the gear box, the size and pitch of the propeller, and other properties, are usually selected to provide optimum performance to the boat at or near the wide open throttle condition since the boat tends to be operated in this manner for longer periods of time than for other conditions. However, with such a selection, performance of the boat under other conditions suffers.

This is particularly true of the acceleration performance of the boat needed to promptly place a planing hull on plane or to pull a water skier out of the water. The large loads applied to the engine by the hydrodynamically loaded propeller prevent the increases in engine speed and corresponding increases in engine power needed to accelerate the boat. The effect is analogous to that of attempting to accelerate a heavily loaded land vehicle from slow speed in high gear.

It may, therefore, be necessary to use a larger engine in the boat simply to provide the desired acceleration performance. The larger engine decreases fuel economy. Or, compromises may be required between wide open throttle operating properties and acceleration performance. For example, the size of the propeller can be reduced to reduce loads on the engine during acceleration, but often only at the expense of efficient wide open throttle operation. Another approach is to use a two speed gear box but this has not met with widespread technical or commercial acceptance.

It is, therefore, the object of the present invention to provide a marine drive that lends improved acceleration performance to the boat, while at the same time, retaining or enhancing performance in other operating conditions, such as at wide open throttle.

To this end, the marine drive of the present invention employs a lock-up torque converter between the marine drive engine and gear box. Such a torque converter has a slip condition, in which its input and output shafts are coupled in a torque magnifying manner through the fluid coupling of the converter, and a lock-up condition, in which the input and output shafts are directly and mechanically connected together.

During acceleration of the boat, the torque converter is placed in the slip mode. The slip in the torque converter relieves the loading of the engine by the propeller. The engine speed may thus increase toward that providing maximum engine power. The increased engine power and the torque magnification available in the torque converter increase the acceleration performance of the boat.

At low, or idling, speeds and at sustained, high speeds, there is only small slip in the torque converter so that the torque converter may be operated to the lock-up condition to provide a highly efficient direct, mechanical coupling of the engine to the propeller.

The control of the torque converter into the slip mode during acceleration may be accomplished responsive to one or more operative conditions in the marine drive, including engine speed, converter slip, throttle position, engine intake manifold vacuum, and engine ignition advance.

The torque converter may be placed in the slip condition at low engine speed for reduced trolling boat speeds and to relieve loads on the drive train when engaging and disengaging the gears in the gear box. This facilitates placing the marine drive in gear from neutral and taking it out of gear from the forward or reverse condition.

The invention will be further explained with the aid of the following drawings and detailed description of preferred embodiments.

In the drawings:

FIGS. 6A through 6H are schematic circuit diagrams of controls for the fluid power circuit.

Figure 1:
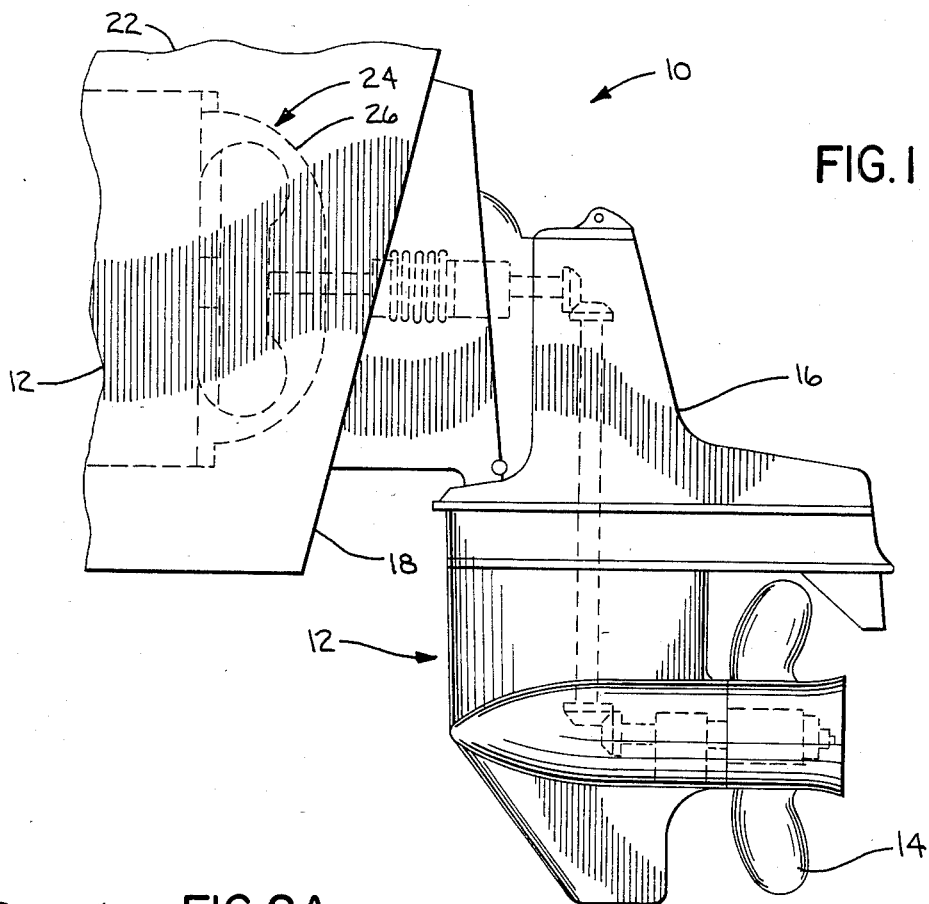
FIG. 1 is a somewhat diagrammatic view of the improved marine drive of the present invention.

The improved marine drive 10 of the present invention is shown, for exemplary purposes in FIG. 1, as an inboard-outboard stern drive. Marine drive 10 has propulsion unit 12 with propeller 14 and fixed gear ratio gear box 16 mounted on the exterior of transom 18. Engine 20 of conventional construction is mounted inside boat 22.

Figure 2A:
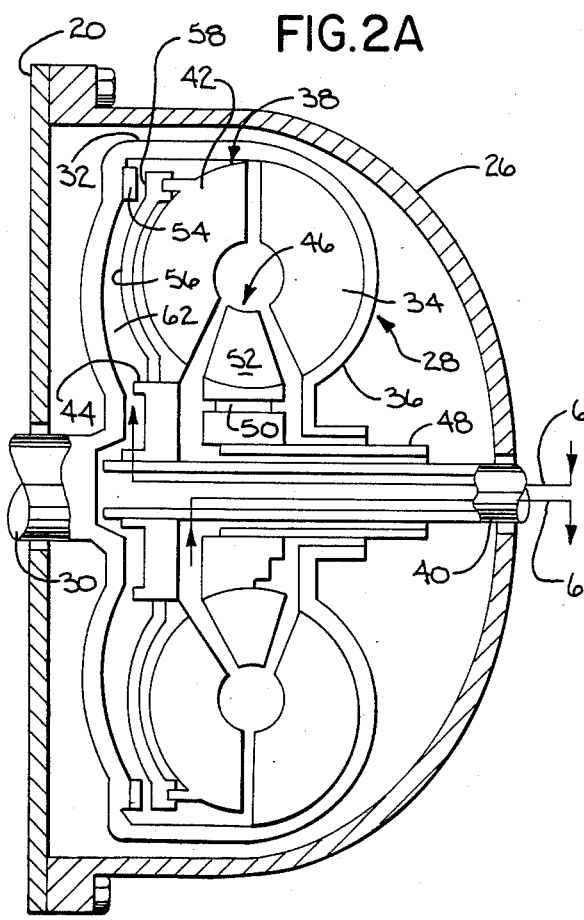
FIGS. 2A and 2B are schematic diagrams of a torque converter element used in the improved marine drive of the present invention.
Figure 2B:
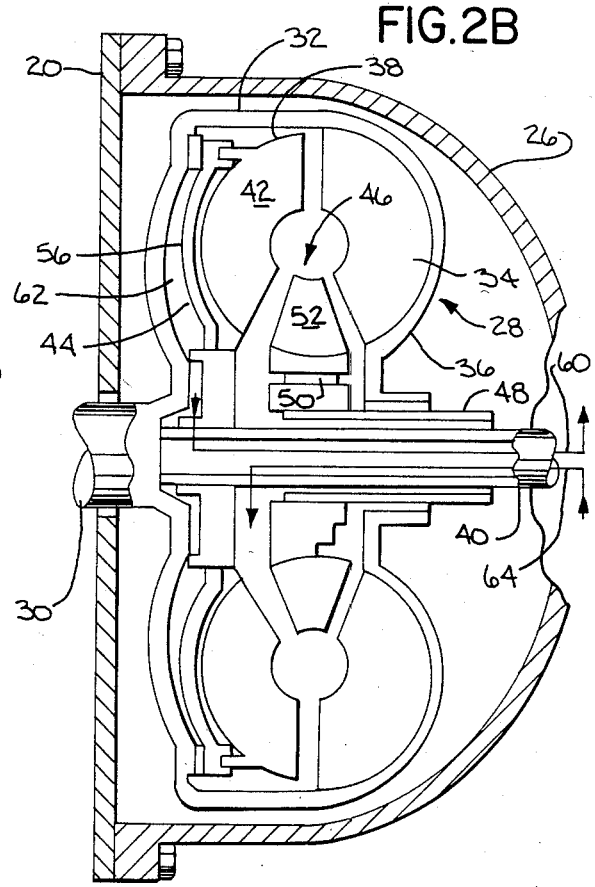

In accordance with the present invention, torque converter 24 is interposed between engine 20 and propeller 14. As shown in FIGS. 1 and 2A and 2B torque converter 24 has housing 26 bolted to the crankcase of engine 20. A pump or driven member 28 is coupled to the crank shaft 30 of engine 20 that forms the input shaft to torque converter 24. Pump 28 includes casing 32 containing a torque transmitting hydraulic fluid. Pump 28 also includes impeller blades 34 in cup-like frame 36 that circulate hydraulic fluid through casing 32.

Turbine, or driven member, 38 is connected to the output shaft 40 of torque converter 24 that extends to gear box 16. Turbine 38 includes blades 42 mounted in cup-like frame 44. Turbine 38, and hence shaft 40, are driven by the action of the fluid circulated in casing 32 by pump 28 against blades 42.

Stator 46, mounted on reaction shaft 48 through free wheeling clutch 50, contains torque multiplying, fluid deflecting blades 52.

To provide lock-up in torque converter 24 and a direct, mechanical connection between torque converter input shaft 30 and output shaft 40, pump 28 and turbine 38 are provided with mutually engaging clutch plates. Specifically, pump 28 has annular lock-up clutch plate 54 mounted on casing 32. Turbine 38 has disk member 56 containing annular lock-up clutch plate 58 opposing clutch plate 54. A hydraulic fluid conduit 60 leads to the space 62 between disk member 56 and casing 32. When hydraulic fluid from conduit 60 pressurizes space 62, clutch plates 54 and 58 are forced apart and prevented from engaging. Torque converter 24 thus cannot operate in the lock-up mode but only in the conventional manner.

A second hydraulic fluid conduit 64 leads to the main portion of casing 32 to the right of disk member 56 when the torque converter is viewed as in FIGS. 2A and 2B. When fluid from conduit 64 pressurizes the main portion of casing 32, clutch plates 54 and 58 are forced together to directly couple input shaft 30 and output shaft 40 together. Coil or other springs may be used in connection with clutch plate 54 and/or member 56 to absorb any shocks associated with the absorption of the slip in torque converter 24 when the clutch plates are engaged.

The operation of marine drive 10 of the present invention, is described below in a simplified operative sequence of accelerating boat 22 to full speed. Prior to the acceleration, it may be assumed that engine 20 is at steady state idling speed. Torque converter 24 is placed in the slip or nonlock-up mode by pressurizing conduit 60. Engine 20 is connected to propeller 14 through the fluid coupling of torque converter 24. The speed of propeller 14 will be proportional to that of engine 20 as determined by the gear ratio in gear box 16 but less the rather small slip in torque converter 24.

To accelerate boat 22 to full speed, the throttle for engine 20 is moved to the wide open position, increasing the speed of engine 20 and torque converter pump 28. The increased speed of pump 28 expands the slip in torque converter 22 and the torque magnification provided by the torque converter between engine 20 and propeller 14. The slip of torque converter 24 permits the speed of engine 20 to increase rapidly responsive to the wide open engine throttle. This similarly increases the power output of engine 20 to torque converter 24. The increased power input to torque converter 24 and the torque magnification of the converter meet the hydrodynamic loads placed on propeller 14 as its speed increases in the water, without excessive loading of engine 20. The result is a rapid acceleration of boat 22.

During the acceleration of boat 22, the speed of engine 20 increases to rated speed. The speed of propeller 14 is increased by the torque transmitted by torque converter 24. At the end of the acceleration, when boat 22 has attained full speed, the speed of torque converter input shaft 30 and torque converter output shaft 40 will again differ by a small amount of slip in torque converter 24. Hydraulic pressure is applied in conduit 64 of torque converter 24 to move clutch plates 54 and 58 into engagement and place torque converter 24 in the lock-up condition. This removes slip from torque converter 24 and provides a direct mechanical connection between engine 20 and propeller 14, resulting in efficient full speed operation of boat 22.

By contrast to the foregoing operation, and as noted above, in a conventional marine drive having a continuously directly coupled engine and propeller, the propeller loading occurring acceleration prevents the rapid increases in engine speed necessary to obtain increased engine power for accelerating the boat, lessening boat performance under these conditions.

Figure 3:
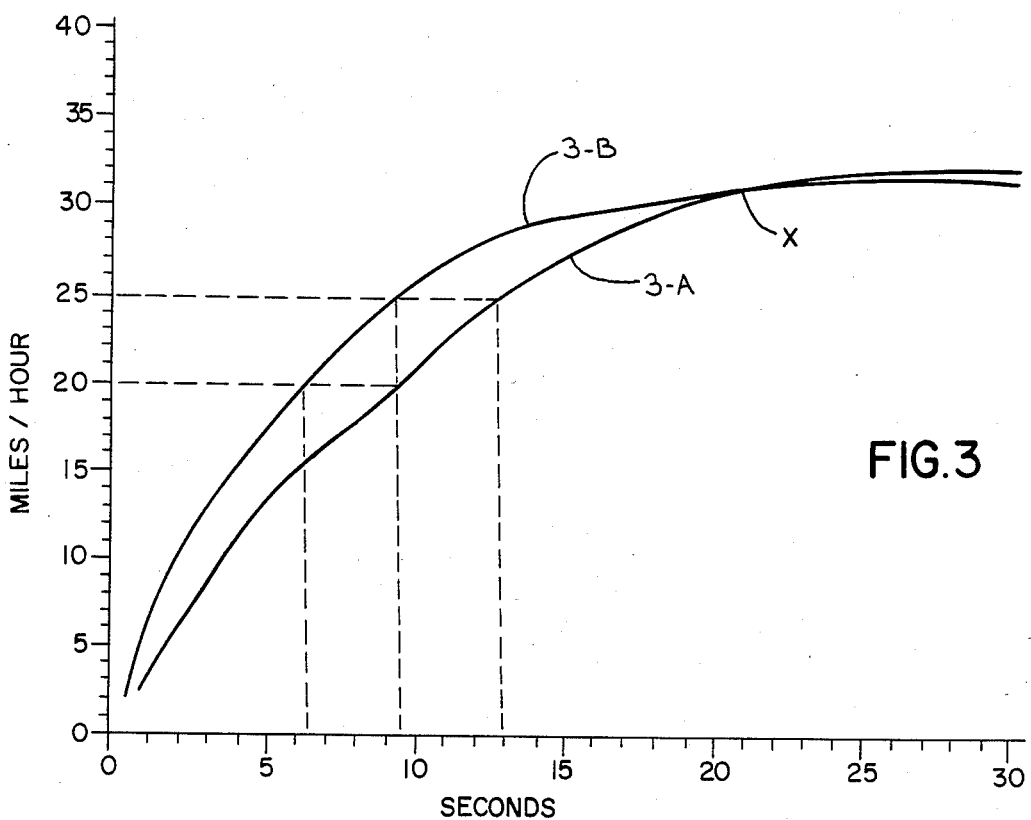
FIG. 3 is a graphic illustration of the relationship between boat speed and time in the improved marine drive and in a conventional marine drive.
Figure 4:
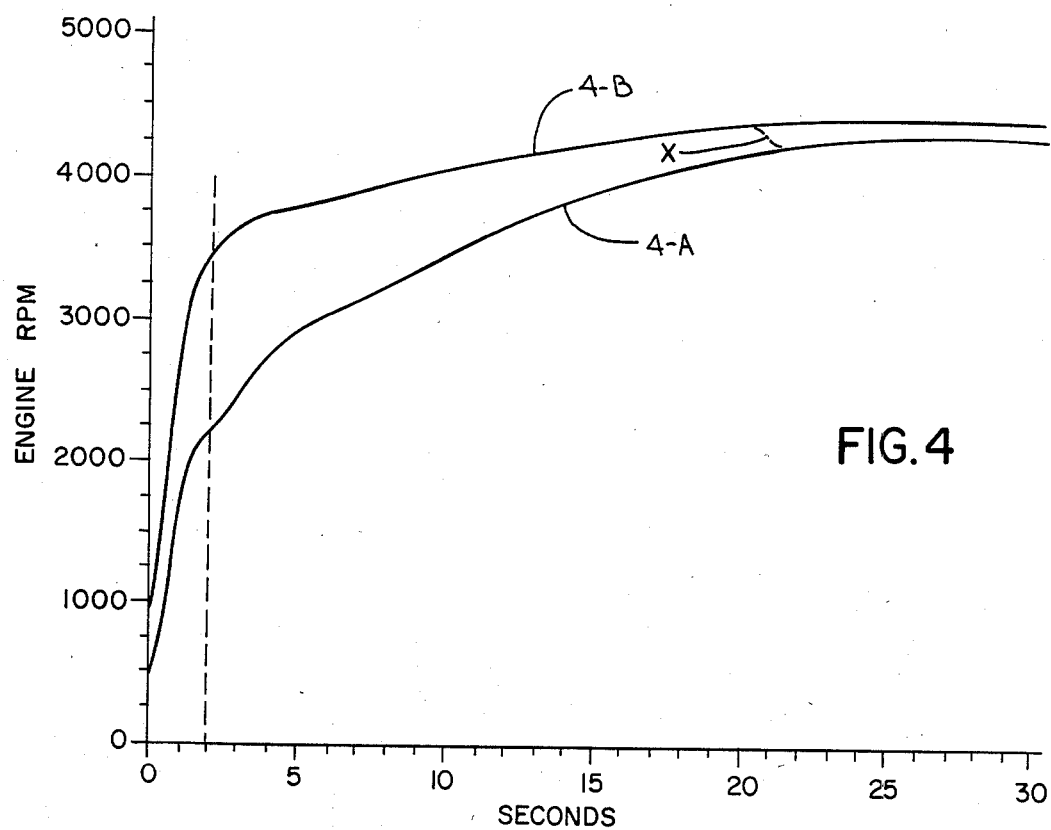
FIG. 4 is a graphic illustration relating engine speed and time in the improved marine drive and in a conventional marine drive.

The improved performance obtained by marine drive 10 of the present invention is shown in FIGS. 3 and 4. FIG. 3 shows boat acceleration performance by relating boat speed in miles per hour to time in seconds. The boat used to generate the data shown in FIGS. 3 and 4 was a 25 ft. boat driven by a stern drive having a 220 horsepower engine. The torque converter was taken from an automatic transmission sold by the Hydramatic Division of General Motors Corporation under the designation THM 12SC. The torque converter had a 10 $\frac{1}{4}$″ outside diameter and is designated Hydramatic Part No. 8636200. The graph labeled 3-A shows performance of a boat in which the engine is directly connected to the propeller throughout the entire operational sequence, as in a conventional marine drive. The graph labeled 3-B shows performance with the improved marine drive of the present invention containing torque converter 24.

As will be noted from line 3-A, due to the loading of engine 20 by propeller 14 in a conventional marine drive, it takes 9.6 seconds for the boat to reach 20 miles per hour. For the boat to reach 25 miles per hour requires 13 seconds.

The line 3-B indicates that marine drive 10 of the present invention having torque converter 24 can accelerate the boat to 20 miles per hour in only 6.4 seconds rather than 9.6 seconds. This represents an improvement in acceleration performance of 33%. The boat is accelerated to 25 miles per hour in 9.5 seconds rather than the 13 seconds formerly required.

As the acceleration continues and is completed, the speed of the boat with the direct engine connection shown in line 3-A exceeds that of the boat with torque converter 24 shown in line 3-B by the slip in torque converter 24. Therefore, at point X, wherein lines 3-A and 3-B cross, torque converter 24 can be operated to the lock-up condition to remove the slip in torque converter 24 and provide the maximum boat speed shown by the line 3-A.

FIG. 4 shows the improved operation of marine drive 10 by relating engine speed in rpm to time in seconds. The boat, engine, and torque converter are the same as was used for FIG. 3. Line 4-A shows conditions existing in a marine drive of the conventional type with a direct connection between the engine and propeller. Line 4-B shows conditions existing in the improved marine drive of the present invention containing torque converter 24. The greater engine speed permitted by torque converter 24 when the throttle is opened is immediately apparent from FIG. 4. For example, at the time of 2 seconds an engine directly coupled to the propeller 14 is so loaded by the latter that it can only attain a speed of approximately 2,250 rpm as shown by the line 4-A. When torque converter 24 is interposed between engine 20 and propeller 14 as in the present invention, the engine can achieve a speed of 3,500 rpm shown by line 4-B, due to the slip in torque converter 24, thereby to provide greater power output from engine 20 and the greater acceleration to the boat shown in FIG. 3.

The point X of FIG. 3 is also shown on the graph of FIG. 4. At this point, torque converter 24 is locked-up and the engine speed can be reduced to that of line 4-A since the excess speed of line 4-B represents the slip in torque converter 24.

While a marine drive incorporating a torque converter manufactured by the Hydramatic Division of the General Motors Corporation has been described above for illustrative purposes, other suitable torque converters are available. The size of the torque converter is typically selected so as to permit the engine to attain a speed, on acceleration, approaching the maximum power speed of the engine, thereby to provide maximum power for the acceleration. Too small a converter may permit the engine to overspeed during the acceleration. Too large a torque converter loads up the engine, reducing engine speed and power on acceleration.

Figure 5:
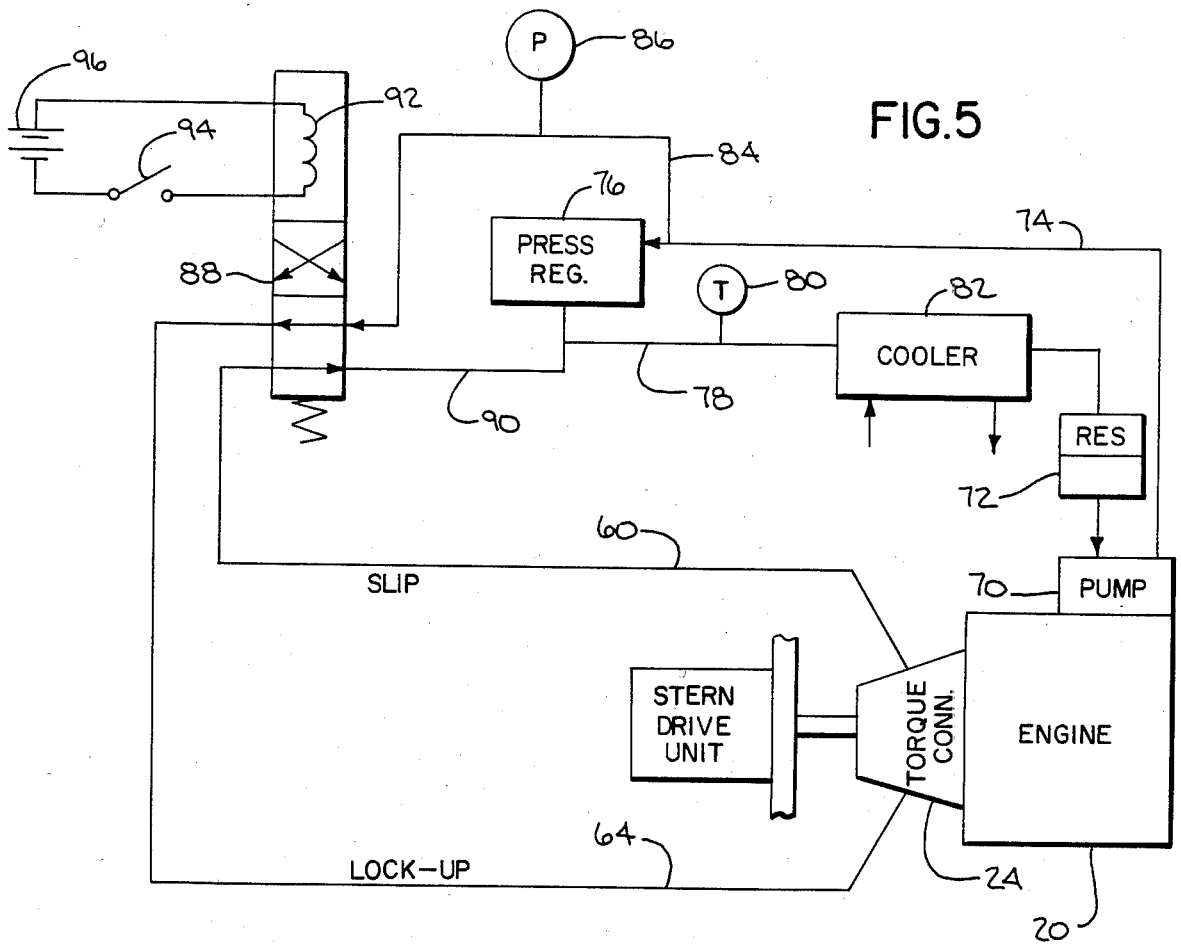
FIG. 5 is a schematic diagram of a fluid power circuit for the improved marine drive.

FIG. 5 shows a typical fluid power circuit suitable for controlling the operation of torque converter 24. The hydraulic circuit is provided with pressurized hydraulic fluid from pump 70 driven by engine 20. Pump 70 provides pressurized hydraulic fluid from reservoir 72 in conduit 74 to bypass pressure regulator 76. The bypass conduit 78 contains temperature gauge 80 and water cooled hydraulic fluid cooler 82. Pressure regulator 76 provides hydraulic fluid in conduit 84 at a typical pressure of 70-80 psi. Pressure gauge 86 is inserted in conduit 84. Conduit 84 is connected to valve 88 that may be of the two position, 4-way, solenoid operated, spring return type. Return conduit 90 extends between valve 88 and return conduit 78 to return low pressure oil, typically 10 psi tc pump 70. Conduits 60 and 64 of torque converter 24 are also connected to valve 88. The solenoid 92 of valve 88 is connected through a control means, schematically shown as switch 94 to an electrical power supply 96.

With the circuit as shown in FIG. 5, pressurized hydraulic fluid is provided from conduit 84 through valve 88 to conduit 64 to place torque converter 24 in the lock-up condition. The fluid return is through conduit 60. When switch 94 is closed, solenoid 92 is energized to shift the position of valve 88. This provides pressurized fluid from conduit 84 in conduit 60 to place torque converter 24 in the slip mode. Hydraulic fluid is returned through conduit 64 to conduits 90 and 78 to pump 70.

Beyond the simple switch control shown in FIG. 5, it may be desirable to control the operation of torque converter 24 between the unlocked or slip state and the lock-up state in accordance with operative conditions existing in marine drive 10. In a simple form of such control, switch 94 may be operated responsive to engine speed. For example, for the engine illustrated in FIG. 4, at engine speeds below 4,300 rpm, switch 94 is closed to place torque converter 24 in the slip mode. When engine speed reaches approximately 4,300 rpm, switch 94 is opened and torque converter 24 is placed in the locked-up condition.

For this purpose, switch 94 may be a centrifugal switch responsive to engine speed. Or, a tach-generator could be coupled to crankshaft 30 to provide an electrical signal proportional to engine speed. When the signal reaches a magnitude corresponding to lock-up speed, solenoid 92 would be operated to place torque converter 24 in the lock-up condition.

As will be noted from FIG. 4, there is little difference in engine operation, either with or without torque converter 24, below approximately 1500 rpm. The advantages attendant the use of torque converter 24 are not required in this speed range so that torque converter 24 may operate in the locked-up condition below 1500 rpm to aid in low speed maneuvering, such as docking, and to increase the operating efficiency of the marine drive. The control for torque converter 24 may thus cause it to operate in the slip mode when engine speed is above 1500 rpm but below 4300 rpm. At speeds below 1500 rpm and above 4300 rpm, torque converter is locked-up.

Figure 6A:
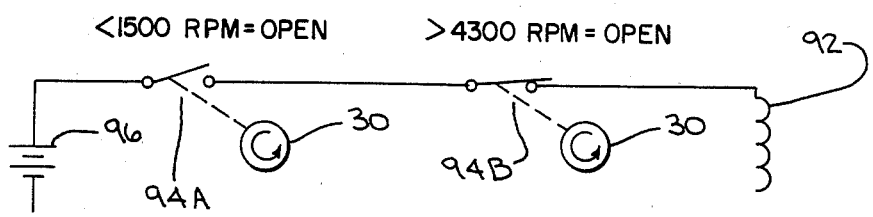

For this purpose, and as shown in FIG. 6A, centrifugal switch 94A is connected in series with centrifugal switch 94B between power supply 96 and solenoid 92. The switches may be coupled to crank shaft 30 to sense the speed of engine 20. Centrifugal switch 94A is open when the speed of engine 20 is below 1500 rpm (<1500 rpm=open). Centrifugal switch 94A closes when engine speed exceeds 1500 rpm. Switch 94B is closed when the speed of engine 20 is below 4300 rpm and opens when engine speed exceeds 4300 rpm (>4300=open). At engine speeds between 1500 rpm and 4300 rpm, both switches 94A and 94B are closed, energizing solenoid 92 and placing torque converter 24 in the slip condition for accelerating boat 22. A tach-generator may similarly provide this operation. Or, where a digital tachometer is utilized, pulse counting, digital circuitry may be used to select the desired range in which torque converter 24 is operated in the slip mode.

In many cases, it may not be desired to accelerate boat 22 to top speed but rather to a lesser speed, such as a sustained cruise speed. To obtain lock-up of torque converter 24 in this circumstance, several control techniques may be utilized. For example, a timer may be used so that any time engine speed remains constant between 1500 rpm and 4300 rpm for a predetermined period of time, torque converter 24 would be operated to the lock-up condition. The timing period of the timer would be sufficient to allow acceleration of the boat to occur with the torque converter 24 in the slip mode. For example the timing period could be 30 seconds.

Figure 6B:
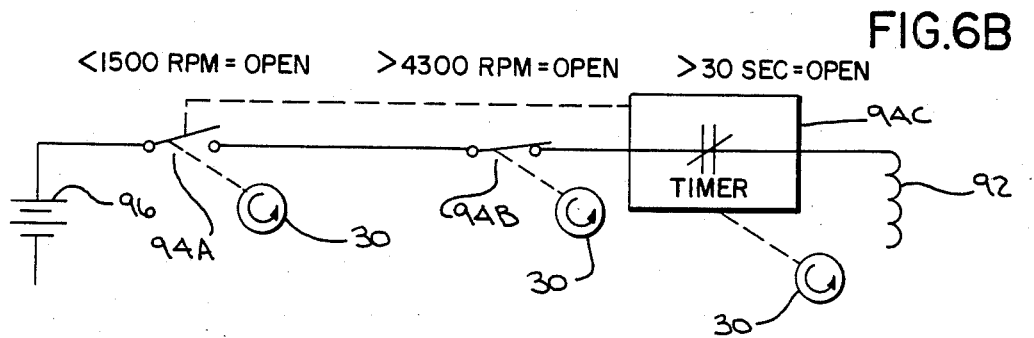

In FIG. 6B, timer 94C, containing normally closed switching contacts, is connected in series with switches 94A and 94B. Timer 94C continuously samples the speed of crankshaft 30, for example through pulse counting digital circuitry. If the speed of crankshaft 30 remains constant for a predetermined period, for example 30 seconds, the switch contacts of the timer open, placing torque converter 24 in the lock-up condition.

Throttle position can also be used as an indicator of the acceleration condition in marine drive 10. As shown in FIG. 6C, a switch 94D can be so mounted in association with throttle 98 that it will be closed by cam 100 when the throttle is moved to the wide open position, or a position close to wide open such as ⅞ths open. Preferably, such a throttle switch 94D would be connected in series with speed switch 94B. If engine speed is less than 4300 rpm and throttle 98 is in the wide open position, torque converter 24 will be operated to the slip condition. As the boat accelerates and engine speed exceeds 4300 rpm, switch 92B will open, placing torque converter 24 in the lock-up condition.

The intake manifold vacuum of engine 20 may also be sensed to control the operation of torque converter 24. At idle speeds, the carburetor throttle plate is substantially closed and intake manifold vacuum is large, for example 20" Hg. With the throttle plate wide open, as during acceleration, the intake manifold vacuum is low, for example, 1" Hg. Thus, a switch, 94E, operated by the vacuum of intake manifold 102, may be used to operate torque converter 24 between the slip and lock-up conditions, as shown in FIG. 6D. Switch 92E operated by the vacuum in intake manifold 102 is placed in series with switch 94B. When the speed of engine 20 is below 4300 rpm and the vacuum in intake manifold 102 becomes less than 6" Hg, switch 94E will be closed, operating torque converter 24 to the slip mode.

The ignition advance or timing of engine 20 can also be used to control the operation of torque converter 24. When engine speed is low, the ignition advance is also low, for example, 8°. When engine speed is high, the spark must be advanced to, for example, 36°. Thus the amount of ignition advance may be sensed, as at the distributor of engine 20 and be used in conjunction with one or more of the engine responsive switches described above to operate torque converter 24. FIG. 6E shows such an arrangement in which switch 94F, coupled to distributor 104, is connected in series with switch 94D operated by throttle 98 and centrifugally operated switch 94B. Switch 94F closes when the spark advance exceeds 15°. When coupled with a wide open throttle position, this will connect battery 96 to solenoid 92 to operate valve 88 to place torque converter 24 in the slip mode until engine speed exceeds 4300 rpm.

Torque converter 24 can be operated to the slip mode anytime the difference in speed between input shaft 30 to torque converter 24 and output shaft 40 from torque converter 24 is greater than a predetermined amount. A large speed difference is indicative of the high slip, acceleration condition in which the engine speed has increased but propeller speed has not.

Under steady state idle conditions the ratio of input shaft speed to output shaft speed may typically be 1.25:1 for the marine drive 10 used to generate the data shown in FIGS. 3 and 4. At steady state maximum speed operation the ratio may be as low as 1.05:1. During acceleration the ratio may expand to 3:1.

Input and output shaft speeds may be obtained from torque converter 24 by comparing digital or analog electric signals obtained from tachgenerators 106 and 108 coupled to shafts 30 and 40, respectively in a comparator 110, as shown in FIG. 6F. The output signal of comparator 110 is a signal indicative of the slip in torque converter 24 and may be used to actuate a switch 94G to lock up torque converter 24 when the slip in the torque converter decreases below a predetermined ratio. For example, switch 94G opens when the slip in torque converter 24 is less than 1.25:1.

Switch 94G may be connected in series with switch 94H operated by throttle 98. Throttle 98 has cam 112 that closes switch 94H when throttle 98 is more than ⅛th open. When marine drive 10 is at idle, both switch 94G and 94H will be open, placing torque converter 24 in the lock-up condition. When marine drive 10 is accelerated, switch 94H is closed as throttle 98 is advanced. When the slip in torque converter 24 expands beyond 1.25:1, switch 94G closes, connecting power source 96 to solenoid 92 and placing torque converter 24 in the slip condition. When the acceleration is complete and the slip in torque converter 24 drops below 1.25:1, switch 94G opens, again placing torque converter 24 in the lock-up condition.

During deceleration, torque converter 24 may be left in the lock-up condition, since engine 20 is being unloaded, rather than loaded. Switch 94H is opened when throttle 98 becomes less than ⅛th open. However, with torque converter 24 in the lock-up condition, there is no slip in the torque converter that can be measured in comparator 110. Comparator 110 may therefore be reset by a signal 113 to reset input 114 from throttle 98 so that comparator 110 is prepared to sense slip and to close switch 94G in the next acceleration.

While various means of sensing operative conditions in marine drive 10 have been individually discussed above and combined in certain manners, it will be appreciated that they can be combined in various other manners to provide the desired control to torque converter 24. Generally this control will be such that torque converter 24 is operated in the lock-up condition at low speed and high speed and is operated in the slip condition during the intermediate speed changes associated with acceleration. Or, stated conversely, torque converter 24 should be in the lock-up condition at all times except during acceleration.

Further, while the values of certain operating parameters of marine drive 10 used to control torque converter 24 have been given above, for illustrative purposes, it will be appreciated that the actual values of the parameters utilized will depend on the operating characteristics of the particular marine drive involved.

Also, it will be appreciated that since the control of torque converter 24 is dependent on the operating characteristics of engine 20, and independent of the operating characteristics of boat 22, the control of torque converter 24 will automatically adjust to different boat designs.

Modifications to the marine drive general operative mode, described above are possible. For example, in order to troll at extremely low speeds, it may be desirable to operate torque converter 24 in the slip mode even when the engine is idling. The slip in torque converter 24 will produce the lower propeller speeds desired for slower trolling. This operation may be accomplished by placing a "troll" switch 116 in parallel with switch 94A, as shown in FIG. 6G. If it is desired to place torque converter 24 in the slip condition below an engine speed of 1500 rpm, troll switch 116 is closed to bypass switch 94A.

To shift between forward and reverse in a marine drive, it is often desirable to reduce loading on the drive train. One technique currently used to accomplish this is to momentarily ground the ignition of the engine during a shift.

With torque converter 24 in marine drive 10, loads on the drive train may be reduced by placing torque converter 24 in the slip condition so that the fluid coupling afforded by the torque converter lessens the loads. Thus, as shown in FIG. 6H, a control consisting of switch 94A and 94B may be provided to energize solenoid 92 from battery 96. Connected in parallel with these switches is switch 118 operable by gear shift lever 120. Gear shift lever 120 contains a pair of cams that close switch 118 when gear shift lever 120 is moved between the forward and neutral positions and the reverse and neutral positions. The parallel path provided by switch 118 energizes solenoid 92 to place torque converter 24 in the slip condition when going into or pulling out of gear. This facilitates the shifting of the gears.

Various modes of carrying out the invention are contemplated as being within the scope of the following claims distinctly pointing out and claiming the invention as follows.

I claim:

1. In a marine drive for a boat, said marine driving having an engine and a propulsion unit, the improvement comprising:

a torque converter interposed in the marine drive between the engine and propulsion unit, said torque converter having a torque magnifying fluid coupling between an input shaft coupled to the engine and an output shaft coupled to the propulsion unit, said torque converter being capable of assuming a slip condition in which said input and output shafts are coupled through said fluid coupling and a lock-up condition in which said input and output shafts are directly and mechanically coupled together; and control means coupled to said torque converter for operating said torque converter between said slip condition and said lock-up condition; said control means being responsive to the speed of the engine for operating said torque converter into the slip condition when engine speed is below a first predetermined value but above a second predetermined value, lower than said first predetermined value, thereby to provide improved acceleration characteristics to the marine drive; said control means operating said torque converter into the lock-up condition at other engine speeds.

2. The improvement according to claim 1 wherein said control means includes selectively operable means for operating the torque converter into the slip condition at engine speeds below said second predetermined value to improve the trolling characteristics of the marine drive.

* * * * *